United States Patent
Kawara

(10) Patent No.: US 10,516,803 B2
(45) Date of Patent: Dec. 24, 2019

(54) INFORMATION PROCESSING APPARATUS, AND STORAGE MEDIUM

(71) Applicant: CANON KABUSHIKI KAISHA, Tokyo (JP)

(72) Inventor: Satoshi Kawara, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/961,303

(22) Filed: Apr. 24, 2018

(65) Prior Publication Data

US 2018/0324323 A1 Nov. 8, 2018

(30) Foreign Application Priority Data

May 2, 2017 (JP) ................. 2017-091575

(51) Int. Cl.
- *H04N 1/40* (2006.01)
- *G06F 3/12* (2006.01)
- *H04N 1/00* (2006.01)

(52) U.S. Cl.
CPC ......... *H04N 1/40062* (2013.01); *G06F 3/122* (2013.01); *G06F 3/1206* (2013.01); *G06F 3/1245* (2013.01); *G06F 3/1276* (2013.01); *G06F 3/1285* (2013.01); *G06F 3/1298* (2013.01); *H04N 1/00122* (2013.01)

(58) Field of Classification Search
CPC ........ H04N 1/40; H04N 1/00; H04N 1/40062; H04N 1/00122; G06F 3/12; G06F 3/122; G06F 3/1276; G06F 3/1298; G06F 3/1206; G06F 3/1245; G06F 3/1285

USPC .......................................... 358/2.1
See application file for complete search history.

(56) References Cited

U.S. PATENT DOCUMENTS

| | | | |
|---|---|---|---|
| 2006/0221357 A1* | 10/2006 | Uzawa | G06K 9/00463 358/1.1 |
| 2009/0097047 A1* | 4/2009 | Mitsui | G06F 3/1208 358/1.9 |
| 2014/0168697 A1* | 6/2014 | Nakane | G06F 3/1213 358/1.15 |
| 2017/0116501 A1* | 4/2017 | Mori | G06F 3/1206 |

\* cited by examiner

*Primary Examiner* — Allen H Nguyen
(74) *Attorney, Agent, or Firm* — Venable LLP

(57) ABSTRACT

An apparatus that executes a driver program generating an electronic document in a predetermined format based on drawing data in a predetermined type converted by a conversion module, wherein the conversion module converts a drawing command, for an object with a text attribute that satisfies a predetermined condition, of drawing commands making up drawing data of a document into a drawing command with a non-text attribute and delivers text information the type-converted drawing command both relating to the object and to the driver program; and the driver program generates, in the case of receiving the text information and the type-converted drawing command, an electronic document in the predetermined format by representing the object whose attribute has been converted into the non-text attribute of the type-converted drawing command by an object with a text attribute based on the received text information.

20 Claims, 10 Drawing Sheets

```
<Page Width="793.76" Height="1122.56" >
    <Glyphs Fill="#ff000000" FontUri="../Resources/Fonts/A8750BE4-9F6B-4368-A34E-3BCADA2ADF61.odttf"
        FontRenderingEmSize="14.0805"
        StyleSimulations="None"
        OriginX="113.44"
        OriginY="197.44"
        UnicodeString="embedding-permitted font text "
    />
    <Path Data="M 104,130.24 L 203.2,130.24 203.2,182.72 104,182.72 z" >
        <Path.Fill>
            <ImageBrush ImageSource="../Resources/Images/1.PNG"
                Viewbox="0,0,118,164" TileMode="None" ViewboxUnits="Absolute"
                ViewportUnits="Absolute" Viewport="104,130.24,99.2,52.48" />
        </Path.Fill>
    </Path>
</Page>
```
⎫ 401
⎬
⎭

```
<Page Width="793.76" Height="1122.56" >
    <Glyphs Fill="#ff000000" FontUri="../Resources/Fonts/A8750BE4-9F6B-4368-A34E-3BCADA2ADF61.odttf"
        FontRenderingEmSize="14.0805"
        StyleSimulations="None"
        OriginX="113.44"
        OriginY="197.44"
        Indices="49;82;81;16;36;79,49;83;75;68;3,49;55;72;91;87,49;3"
        UnicodeString="embedding-permitted font text "
    />
    <Path Data="M 104,130.24 L 203.2,130.24 203.2,182.72 104,182.72 z" >
        <Path.Fill>
            <ImageBrush ImageSource="../Resources/Images/1.PNG"
                Viewbox="0,0,118,164" TileMode="None" ViewboxUnits="Absolute"
                ViewportUnits="Absolute" Viewport="104,130.24,99.2,52.48" />
        </Path.Fill>
405 ⎯<MetaData>
            <Font Name="MS-mincho"
                FontRenderingEmSize="14.0805"
                StyleSimulations="None"
                OriginX="104"
                OriginY="130.24"
                Indices="36;79;83;75;68;3,49;55;72;91;87,49;3"
                UnicodeString="embedding-prohibited font text"
                License="True" >
            </Font>
        </MetaData>
    </Path>
</Page>
```

FIG.4B

INFORMATION PROCESSING APPARATUS, AND STORAGE MEDIUM

BACKGROUND OF THE INVENTION

Field of the Invention

The present invention relates to a conversion technique of a document format.

Description of the Related Art

Conventionally, a technique to convert a document format by making use of a printer driver is known. For example, there is a printer driver (hereinafter, "PDF conversion driver") that converts document data in an arbitrary format into document data in the PDF (Portable Document Format) format. It is possible for the PDF conversion driver to produce an output as PDF data by performing the same operation as that of printing in an application of business form creation or document management.

In the printing system of Windows (registered trademark) OS of Microsoft Corporation, as the graphics engine, the GDI (Graphics Driver Interface) is used. The conventional printing processing flow using the GDI is called a GDI print path. In the GDI print path, a drawing command in the GDI type issued by an application calling a service function group of the GDI is converted into PDL data by a Version 3 printer driver (hereinafter, "V3 driver") and output to a printing apparatus. PDL data is data described in a page description language that can be interpreted by a printing apparatus. Then, after Windows 8 (registered trademark), a new printing processing flow called an XPS print path is added thereto. The XPS is an XML-based electronic document format and XPS is an abbreviation of XML Paper Specification. In the XPS print path, drawing data in the XPS type is generated in an application and the drawing data is converted into PDL data by a Version 4 printer driver (hereinafter, "V4 driver") and output to a printing apparatus.

The GDI print path and the XPS print path are not in an exclusive relationship and for example, it is possible to convert drawing data in the GDI type generated by an application using the GDI into the XPS type and to convert the drawing data into PDL data by the V4 driver. At this time, conversion from the GDI type into the XPS type is performed by a conversion module called an MXDC (Microsoft XPS Document Converter).

In conversion from the GDI type into the XPS type by the MXDC, there is a case where a text object is replaced with a path object or an image object Here, a text object refers to an object with a text attribute specified by font information and character code. A path object refers to an object with a path attribute specified by path coordinate values and a drawing method and an image object refers to an object with an image attribute specified by size and color information on each pixel. A text object being replaced with a path object or an image object (hereinafter, a non-text object) means that the drawing contents specified with the text attribute on the side of an application are transmitted to the V4 driver as drawing with the path (graphics) attribute or the image attribute. Such replacement may occur in the case where the font that is used for drawing of a text object is an embedding-prohibited font whose embedding into an electronic document is prohibited. In the XPS type, embedding of a font is specified as the format thereof, but it is not possible to embed an embedding-prohibited font. Because of this, a text object that uses an embedding-prohibited font is converted into a path object or an image object. It is known that such replacement of the object attribute, which is not intended by a user, occurs also in the case where decoration, such as transmittance, is specified for a text object.

Then, in the case where the above-described replacement occurs at the time of generation of PDF data by, for example, a PDF conversion driver, which is the V4 driver, such a problem arises that it is no longer possible to search the portion as text and image quality deteriorates.

Consequently, an object of the present invention is to prevent the above-described problem from arising even in the case where the object attribute is changed from the text attribute to the non-text attribute by the MXDC. Specifically, it is made possible for the V4 driver to generate PDL data (or PDF data) that gives instructions to draw the object portion whose attribute is originally the text attribute in drawing data in the XPS type after conversion, which is generated by the MXDC, with the text attribute.

SUMMARY OF THE INVENTION

The information processing apparatus according to the present invention is an information processing apparatus having: a conversion unit configured to receive drawing data of a document that is output from an application in response to instructions to output the document, to convert a type of a drawing command making up the drawing data of the document into a predetermined type, and to deliver the type-converted drawing command to a printer driver; and a printer driver that generates an electronic document in a predetermined format based on the type-converted drawing command received from the conversion unit, and the conversion unit converts a drawing command, for an object with a text attribute that satisfies a predetermined condition, of drawing commands making up the drawing data of the document into a drawing command with a non-text attribute and delivers text information and the type-converted drawing command both relating to the object to the printer driver, and the printer driver generates an electronic document in the predetermined format representing the object whose attribute has been changed to the non-text attribute by an object with a text attribute based on the type-converted drawing command and the text information that are received.

Further features of the present invention will become apparent from the following description of exemplary embodiments with reference to the attached drawings.

BRIEF DESCRIPTION OF THE DRAWINGS

FIG. 4A is a diagram showing an example of a data structure of drawing data converted by a conventional MXDC and FIG. 4B is a diagram showing an example of a data structure of drawing data converted by an MXDC according to a first embodiment;

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically.

[First Embodiment]

Figure 1:
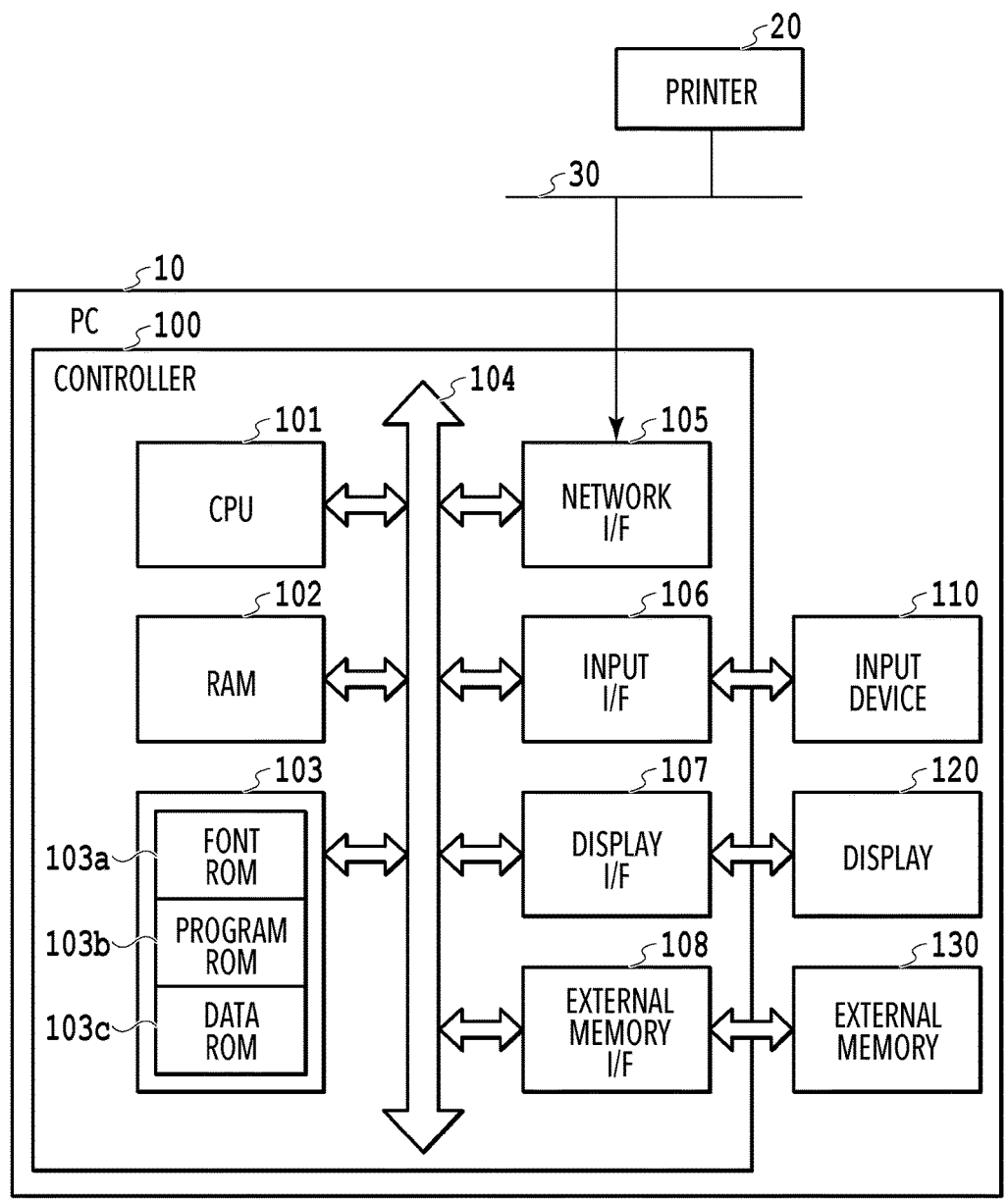
FIG. 1 is a block diagram showing an example of a hardware configuration of a PC in a printing system.

FIG. 1 is a block diagram showing an example of a hardware configuration of a PC in a printing system including the PC and a printer. A PC 10 includes a controller 100, an input device 110, a display 120, and an external memory 130. The controller 100 includes a CPU 101, a RAM 102, a ROM 103, a network I/F 105, an input I/F 106, a display I/F 107, and an external memory I/F 108 and each unit is connected to one another via a system bus 104.

The controller 100 centralizedly controls the PC 10 as an information processing apparatus. The CPU 101 controls each unit connected to the system bus 104 in accordance with programs stored in the RAM 102. The RAM 102 functions also as a main memory, a work area, and so on, of the CPU 101. The ROM 103 stores various programs and data and is made up by dividing into three sections: a font ROM 103a that stores various fonts, a program ROM 103b that stores a boot program, a BIOS, and so on, and a data ROM 103c that stores various kinds of data. The network I/F 105 is an interface that performs communication processing with an external device, such as a printer 20, via a LAN 30. The input I/F 106 is an interface that receives a user input using the input device 110, such as a keyboard and a pointing device (mouse). The display I/F 107 is an interface that controls display processing for the display 120. The external memory I/F 108 is an interface that performs access control with the external memory 130, for example, such as an HDD and an SSD. In the external memory 130, an operating system (OS) and various kinds of software in charge of printing processing, and further, various kinds of data, such as user files and editing files, are stored. In the present embodiment, it is assumed that Microsoft Windows is used as the OS.

Figure 2:
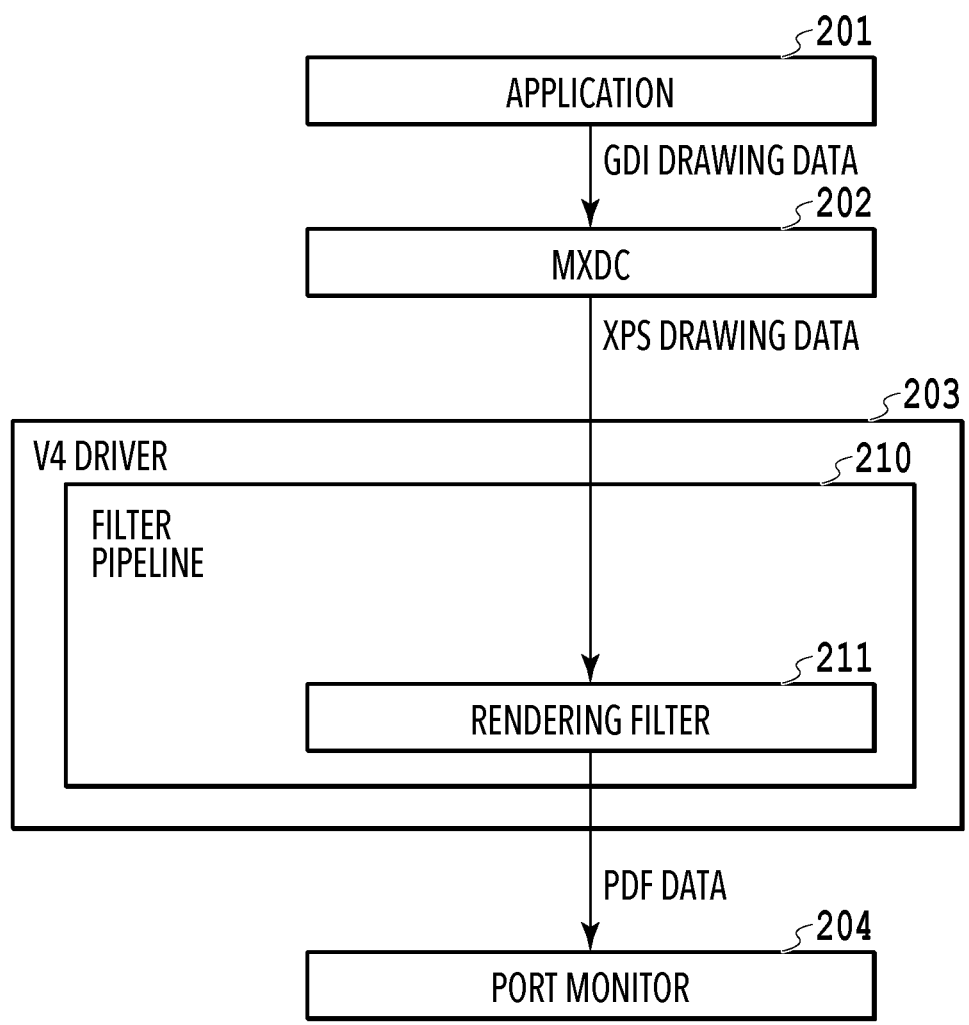
FIG. 2 is a diagram showing an example of a software configuration relating to conversion processing of a document format using a V4 driver.

FIG. 2 is a diagram showing an example of a software configuration (computer program configuration) relating to conversion processing of a document format using a V4 driver in the PC 10. An application 201 is software for a user to create a document and to give printing instructions and instructions to convert into a PDF format (hereinafter, "output instructions"). In the case where a user gives output instructions, the application 201 generates drawing data in the GDI type for a specified document by making use of the GDI. The generated drawing data in the GDI type is sent to an MXDC 202. The MXDC 202 is a conversion module for converting the received drawing data in the GDI type into the XPS type and sending the drawing data to a V4 driver 203. The V4 driver 203 is software for generating PDL data or PDF data in accordance with the output instructions following a programming model called an XPS print filter pipeline (hereinafter, "filter pipeline"). The unit of printing processing in a filter pipeline 210 is called a filter and a single or a plurality of filters is linked and performed in order by the filter pipeline 210. That is, the mechanism is such that the output of a certain filter is the input of the next linked filter and by each filter sequentially performing processing, PDL data or PDF data, which is final output matter, is generated.

In the present embodiment, explanation is given by taking a PDF conversion driver as the V4 driver 203 as an example. Then, it is assumed that the filter pipeline 210 is made up of a single rendering filter 211 that generates PDF data from drawing data in the XPS type. In the rendering filter 211, a drawing command in the XPS type that is input from the MXDC 202 is analyzed and conversion processing, to be described later, is performed after performing image processing, such as enlargement, reduction, and rotation, for each object as needed, and thus, PDF data is generated. The PDF data generated by the rendering filter 211 is saved in the external memory 130 via a port monitor 204. As described above, in the present specification, explanation is given by taking the PDF conversion driver as the V4 driver as an example, but it is needless to say that the application range thereof is not limited to the PDF conversion driver. That is, the present invention is widely applied also to the V4 driver that generates an electronic document in a predetermined format (for example, PDL data) in accordance with output instructions from the application 201 and outputs the electronic document to a printing apparatus.

Figure 3:
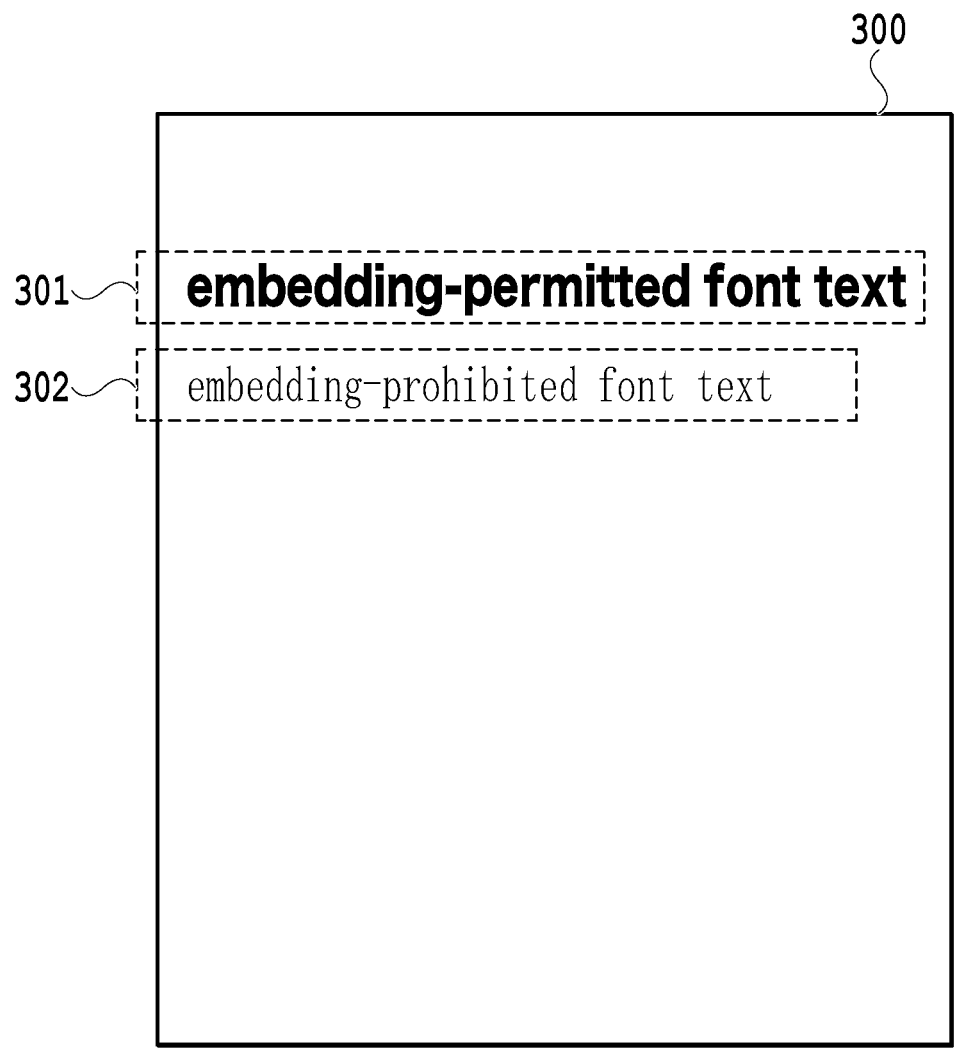
FIG. 3 is a diagram showing an example of a document that is a format conversion target.

Here, the problem of the present invention is reviewed. FIG. 3 shows an example of a document that is a target of format conversion into the PDF format. In a document 300 generated by the application 201, two kinds of text object whose fonts are different exist, that is, a text object 301 and a text object 302. The text object 301 includes a character string of "embedding-permitted font text" and "Hiragino", which is one kind of embedding-permitted font, is used. The text object 302 includes a character string of "embedding-prohibited font text" and "MS-mincho", which is one kind of embedding-prohibited font, is used. The embedding-prohibited font is defined as a font to which an embedding-prohibited attribute is attached. This means that glyph information included within the font file must not be embedded within an electronic document. That is, the embedding-prohibited font can be said in different words as a font that needs to be stored within drawing data as a non-embedding font (except for glyph information). In contrast to this, the embedding-permitted font is defined as a font to which the embedding-prohibited attribute is not attached (glyph information may be stored within drawing data).

In the case of the OpenType font, as information relating to embedding, it is made possible to set flags of "embedding prohibited", "display and print possible", "editing possible", and "installation possible". In the present specification, the OpenType font to which the flag of "embedding prohibited" is set is handled as the "embedding-prohibited font". Then, the OpenType font to which one of the flags of "display and print possible", "editing possible", and "installation possible" is set is handled as the "embedding-permitted font".

In the case of the example in FIG. 3, the text objects 301 and 302 are input to the MXDC 202 as drawing-target objects, respectively. As described above, in the case where the embedding-prohibited font is used in the text object, it is not possible to embed glyph information included within the font file in the drawing data. However, because of the specifications of the XPS, it is necessary to embed a font file including glyph information in drawing data without fail. Because of this, in the MXDC 202, at the time of converting drawing data received from the application 201 from the GDI type into the XPS type, the text object using the embedding-prohibited font is changed to an image object or a path object.

FIG. 4A shows a data structure of drawing data of the document 300 shown in FIG. 3, which is converted into the XPS type in the conventional MXDC. In FIG. 4A, the portion indicated by symbol 401 corresponds to the text object 301 in which the embedding-permitted font is used and the drawing command in the XPS type is represented with the text attribute without being changed. On the other hand, the portion indicated by symbol 402 corresponds to the text object 302 in which the embedding-prohibited font is used and the drawing command in the XPS type is represented with the path attribute, changed from the text attribute. As described above, in the conventional MXDC, the text object using the embedding-prohibited font is changed to the object whose attribute is other than the text attribute.

<Conversion Processing in MXDC>

Figure 5:
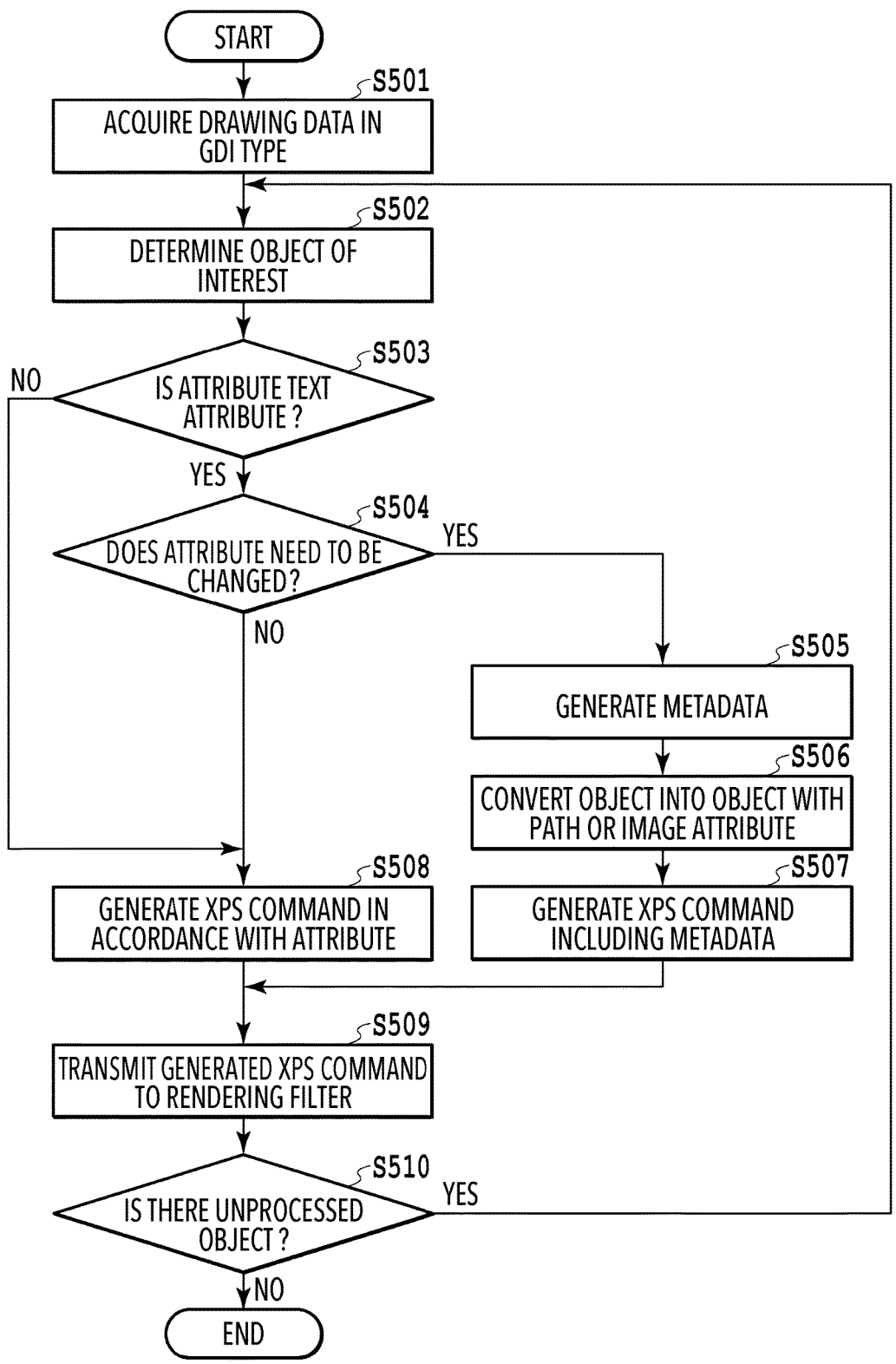
FIG. 5 is a flowchart showing a flow of conversion processing in the MXDC according to the first embodiment.

Following the above, conversion processing to deal with the above-described problem, which is performed in the MXDC 202 of the present embodiment, is explained. FIG. 5 is a flowchart showing a flow of conversion processing in the MXDC 202 according to the present embodiment. This series of processing is performed in units of pages making up a processing-target document. In the following, detailed explanation is given along the flow in FIG. 5.

At step 501, drawing data in the GDI type corresponding to one page, which is received from the application 201, is acquired. Then, at step 502 that follows, from the acquired drawing data corresponding to one page, an object of interest, which is a processing target, is determined.

As step 503, whether the attribute of the object of interest is the text attribute is determined by referring to the drawing command relating to the object of interest. In the case where the results of the attribute determination indicate the text attribute, the processing advances to step 504. On the other hand, in the case of an attribute other than the text attribute, the processing advances to step 508.

At step 504, whether the object of interest with the text attribute is an object whose attribute needs to be changed to the path attribute or the image attribute is determined. In the present embodiment, a predetermined condition in the case of determining that the attribute needs to be changed is defined as the case where the font file specified in the text object is an embedding-prohibited font or the case where decoration, such as transmittance, is specified for the object. In the case where the results of the determination indicate that the attribute needs to be changed, the processing advances to step 505. In the case where the attribute does not need to be changed, the processing advances to step 508.

At step 505, metadata describing details (text information) of the text object as the object of interest is generated. In this metadata, for example, information (for example, a flag) indicating that an embedding-prohibited font is specified or that decoration, such as transmittance, is specified is included, in addition to the font name, the font size, the drawing coordinate position, and the character code. Then, at step 506 that follows, the drawing command in the GDI type relating to the object of interest is converted into a drawing command with the non-text attribute. That is, the attribute of the object of interest is changed from the text attribute to the path attribute or the image attribute. Then, at step 507, a drawing command in the XPS type that gives instructions to draw the object of interest whose attributed has been changed is generated. In the drawing command in the XPS type at this time, the metadata generated at step 505 is included.

At step 508 in the case where the attribute of the object of interest is not the text attribute or the attribute does not need to be changed, the drawing command in the GDI type relating to the object of interest is converted into a drawing command in the XPS type in accordance with the attribute.

At step 509, the drawing command in the XPS type generated at step 507 or step 508 is sent to the rendering filter 211. Then, at step 510, whether there is an unprocessed object within the drawing data corresponding to one page, which is acquired at step 501, is determined. In the case where there is an unprocessed object, the processing returns to step 502, and the next object of interest is determined and the processing is continued. On the other hand, in the case where the processing of all the objects has been completed, this processing is terminated.

FIG. 4B shows a data structure of the drawing data of the document 300 shown in FIG. 3, which is converted into the XPS type in the MXDC 202 of the present embodiment. In FIG. 4B, the portion indicated by symbol 401 is the same as that in FIG. 4A and the drawing command in the XPS type corresponding to the text object 301 in which the embedding-permitted font is specified is represented with the text attribute. The portion indicated by symbol 403 corresponds to the text object 302 in which the embedding-prohibited font is specified. The portion indicated by symbol 403 is the same as that in FIG. 4A in that the attribute of the drawing command in the XPS type is changed from the text attribute to the path attribute, but it is known that metadata 404 is further added. Then, in the metadata 404, as information indicating that the attribute is the text attribute, for example, information, such as "Font name='MS-mincho'", indicating that the font name is MS-mincho is stored.

The above is the contents of the conversion processing that is performed in the MXDC 202 of the present embodiment. By the conversion processing such as this, drawing data in the GDI type is converted into drawing data in the XPS type in units of pages.

<Processing to Generate PDL/PDF Command in Printer Driver>

Figure 6:
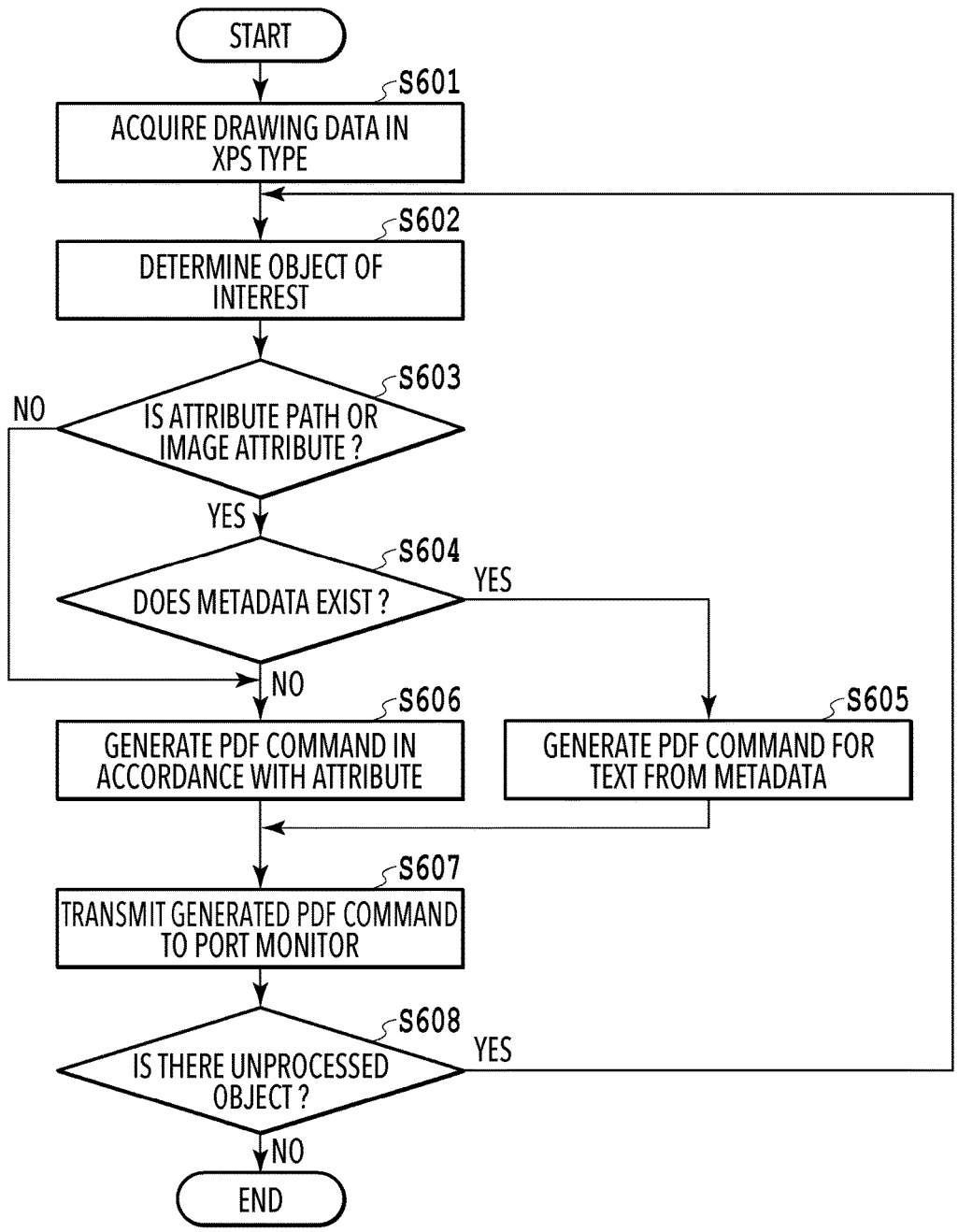
FIG. 6 is a flowchart showing a flow of processing to generate a PDF command according to the first embodiment.

Following the above, processing to generate a PDF command for drawing data in the XPS type generated through the above-described conversion processing in the PDF conversion driver as the V4 driver 203 is explained. FIG. 6 is a flowchart showing a flow of the processing to generate a PDF command according to the present embodiment. This series of processing is performed in units of pages in the rendering filter 211 with the drawing command group in the XPS type generated in the MXDC 202 being taken as an input. In the following, detailed explanation is given along the flow in FIG. 6.

At step 601, drawing data in the XPS type corresponding to one page, which is received from the MXDC 202, is acquired. Then, at step 602 that follows, from the acquired drawing data corresponding to one page, an object of interest, which is a processing target, is determined.

At step 603, whether the attribute of the object of interest is an attribute other than the text attribute (here, whether the attribute corresponds to one of the path attribute and the image attribute) is determined by referring to the drawing command relating to the object of interest. In the case where the results of the attribute determination indicate the path attribute or the image attribute, the processing advances to step 604. On the other hand, in the case of the text attribute, the processing advances to step 606.

At step 604, whether metadata is included in the drawing command relating to the object of interest is determined. It is possible to determine whether or not metadata is included in the drawing command by checking whether a "MetaData" tag 405 exists within the drawing command relating to the object of interest (see FIG. 4B described previously). In the case where metadata is included, the processing advances to step 605 and in the case where metadata is not included, the processing advances to step 606.

At step 605, based on information of the metadata, a PDF command for text is generated. As described previously, in the metadata, information (font name, font size, drawing coordinate position, character code, and so on) necessary to generate a PDF command for text is included, and therefore, by using the information, a PDF command for text is generated.

On the other hand, at step 606 in the case where the attribute of the object of interest is neither the path attribute nor the image attribute, or where the attribute is one of the path attribute and the image attribute but metadata does not exist, a PDF command in accordance with the attribute of the object of interest is generated.

At step 607, the PDF command generated at step 605 or step 606 is sent to the port monitor 204. Then, at step 608, whether there is an unprocessed object within the drawing data corresponding to one page, which is acquired at step 601, is determined. In the case where there is an unprocessed object, the processing returns to step 602, and the next object of interest is determined and the processing is continued. On the other hand, in the case where the processing of all the objects is completed, this processing is terminated. Then, in the case where the processing for all the pages of the processing—target document is completed, the PDF data including the generated PDF command group is saved in the external memory 130 by the port monitor 204.

As described above, according to the present embodiment, even in the case where the attribute of an object is changed from the text attribute to the non-text attribute by GDI-XPS conversion in the MXDC, it is possible to recognize the object as an object with the text attribute in the V4 driver. As a result of this, it is made possible for the V4 driver to generate PDL data (PDF data in the case of the PDF conversion driver) representing the object as an object with the text attribute.

[Second Embodiment]

In the first embodiment, in order to deal with such a problem that a text object is replaced unintendedly with a path or an image object, metadata describing information on text is stored within a drawing command at the time of conversion into the XPS in the MXDC. Then, by analyzing the metadata in the rendering filter, originally the object with the text attribute, which has been changed to a path object or an image object, is reconverted into the object with the text attribute and thus PDL data (or PDF data) is generated. Next, an aspect is explained as a second embodiment in which the same effect as that of the first embodiment is obtained by dealing with the problem on the side of an application that issues a drawing command in the GDI type and the V4 driver, leaving the conversion in the MXDC as it is. Explanation of the portions (the software configuration of the PC 10 shown in FIG. 2 and the like) in common to those of the first embodiment is omitted and in the following, issuance of a drawing command in an application and format conversion in the V4 driver, which are features of the present embodiment, are explained mainly.

<Drawing Command Issuance Processing in Application>

Figure 7:
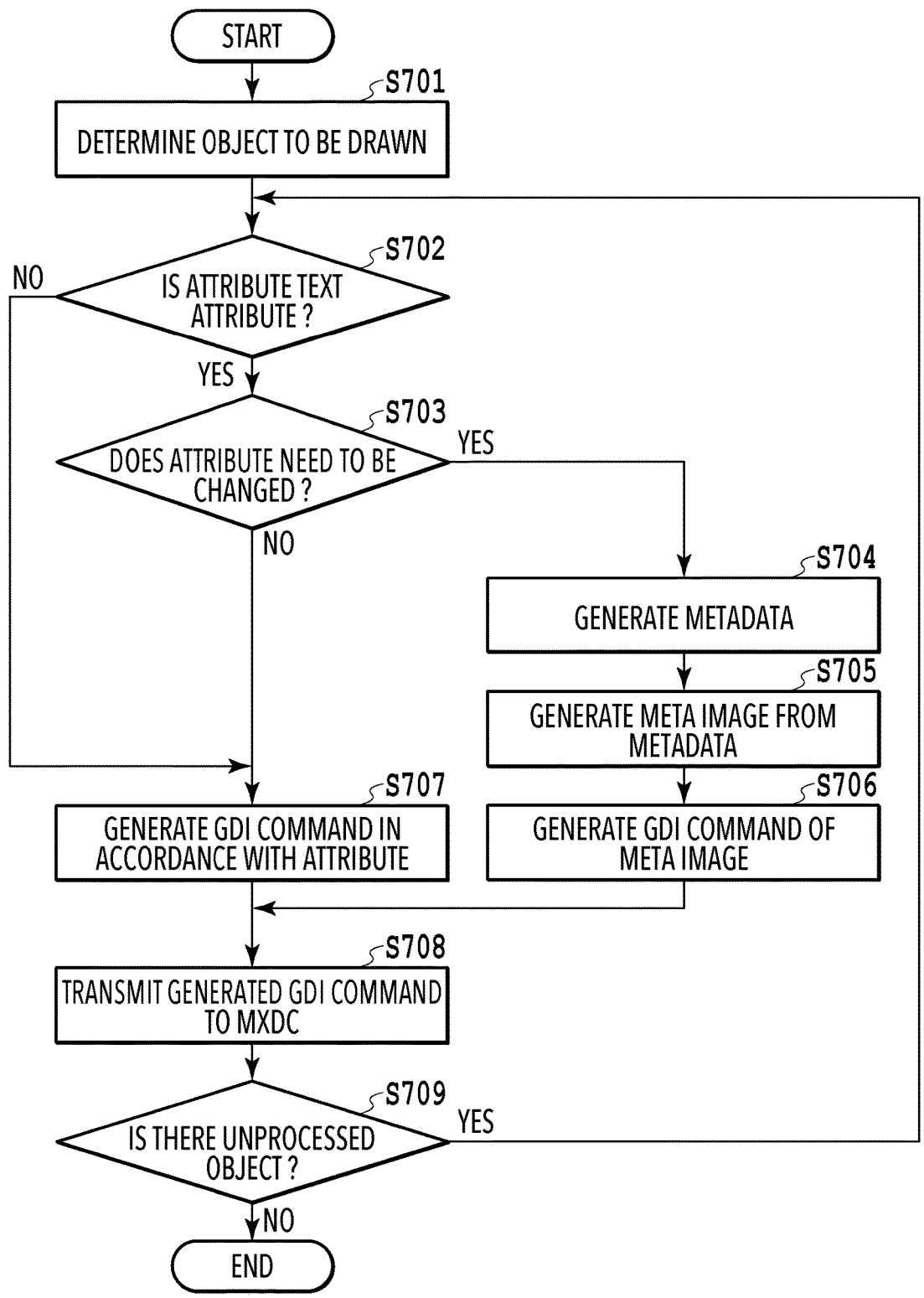
FIG. 7 is a flowchart showing a flow of issuance processing of a drawing command that is performed in an application according to a second embodiment.

FIG. 7 is a flowchart showing a flow of drawing command issuance processing that is performed in the application 201 according to the present embodiment. This series of processing is performed in units of pages making up a processing-target document. In the following, detailed explanation is given along the flow in FIG. 7.

At step 701, a drawing-target object within a page is determined. At step 702 that follows, whether the attribute of the determined drawing-target object is the text attribute is determined. In the case where the results of the attribute determination indicate the text attribute, the processing advances to step 703. On the other hand, in the case of an attribute other than the text attribute, the processing advances to step 707.

At step 703, whether the drawing-target object is an object whose attribute needs to be changed from the text attribute to the path attribute or the image attribute is determined. In the present embodiment, in the case where the font specified in the font file of the text object is an embedding-prohibited font or in the case where decoration, such as transmittance, is specified for the object, it is determined that the attribute needs to be changed. In the case where the results of the determination indicate that the attribute needs to be changed, the processing advances to step 704. In the case where the attribute does not need to be changed, the processing advances to step 707.

Figure 8:
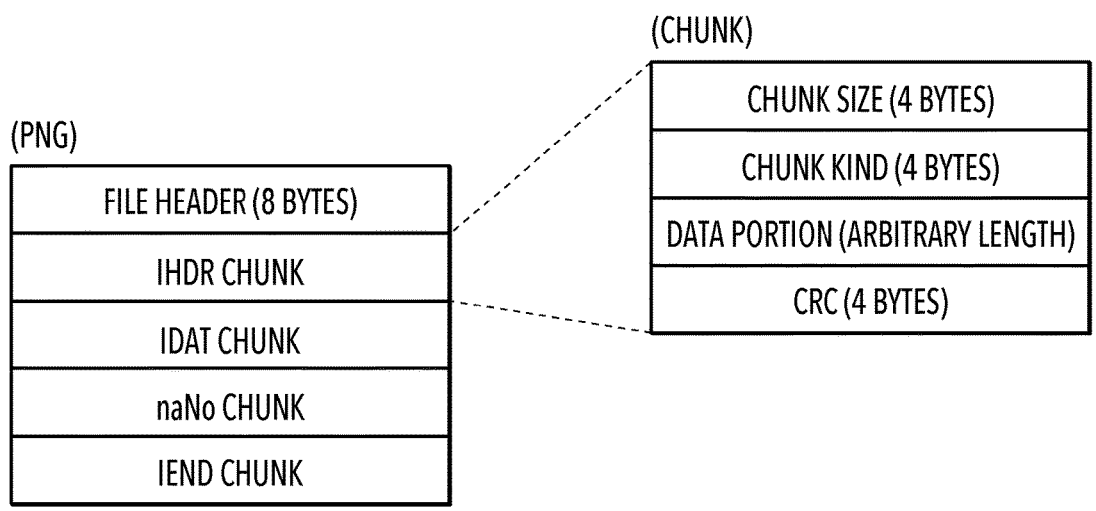
FIG. 8 is a diagram showing a data structure of a meta image using PNG as an image format.
Figure 9:
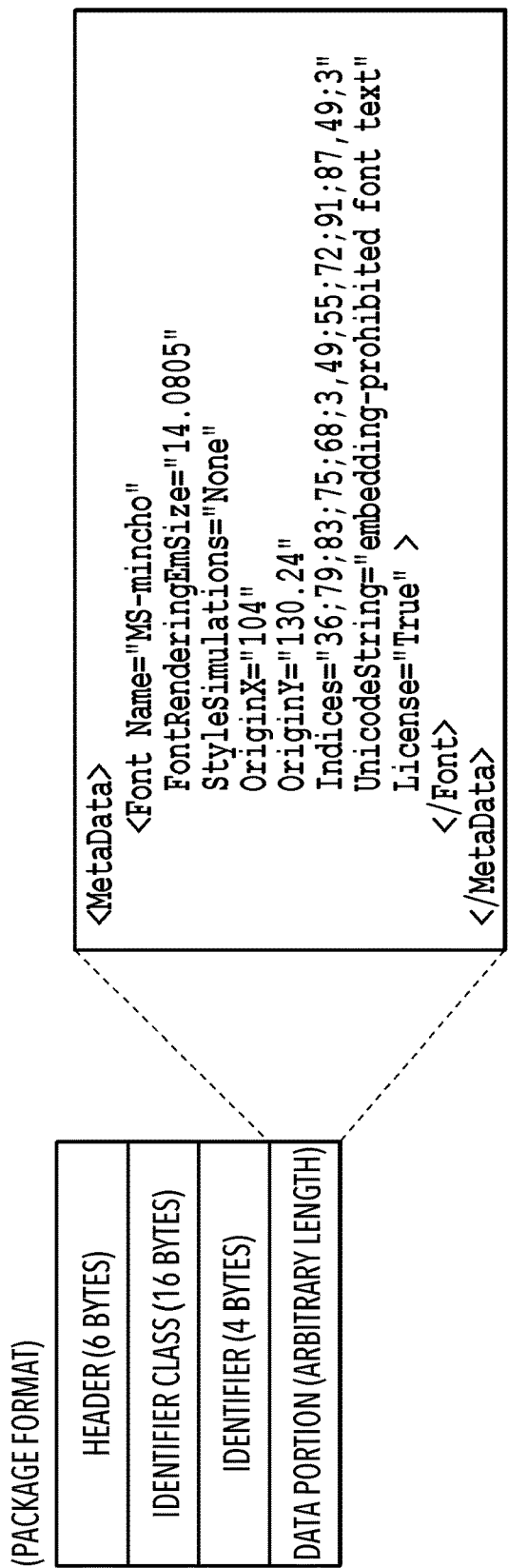
FIG. 9 is a diagram showing an example of a package form to store metadata.

At step 704, metadata indicating that the drawing-target object is a text object is generated. In this metadata, information, such as a flag, indicating that an embedding-prohibited font is specified or that decoration, such as transmittance, is specified is included, in addition to the font name, the font size, the drawing coordinate position, and the character code. At step 705 that follows, based on the generated metadata, object data represented with an attribute other than the text attribute is generated. In the present embodiment, the case is explained as an example where object data with the image attribute called a "meta image" is generated. Here, the meta image means image data that saves metadata as arbitrary data in an extension area of an image format. In the present embodiment, as the image format of a meta image, the PNG is used, but for example, another image format, such as the JPEG whose extension area is defined, may be used. FIG. 8 is a diagram showing a data structure of a meta image using the PNG as the image format. The image format of the PNG includes 8-byte file header and a plurality of data blocks called a chunk. Each chunk includes a chunk size (four bytes), a chunk kind (four bytes), a data portion (arbitrary length), and a CRC (four bytes) and can store various kinds of information relating to an image. The chunk is further classified into two kinds of chunk: an indispensable chunk and an auxiliary chunk. There are four kinds of indispensable chunk: "IHDR", "PLTE", "IDAT", and "IEND". The auxiliary chunk can be defined arbitrarily and whether to interpret the auxiliary chunk depends on the specifications of the program. As what is widely used as the auxiliary chunk, that which specifies an ICC profile or a gamma correction value exists. In the present embodiment, a unique auxiliary chunk called "naNo" is defined and it is made possible to store metadata as arbitrary data. At this time, information of metadata is temporarily stored in another package form and stored in the "naNo" chunk. FIG. 9 is a diagram showing an example of the package form to store metadata. In order to transmit arbitrary data from the application to the printer driver, it is necessary to associate arbitrary data with identification information so that the printer driver on the reception side can identify the kind of data. Consequently, a variable-length package form is defined and stored in the "naNo" chunk. As shown in FIG. 9, the package form includes a header (six bytes), an identifier class (16 bytes), an identifier (four bytes), a data size (four bytes), and a data portion (arbitrary length). The identifier is a value that is determined by the transmission side and the reception side of arbitrary data. In the present embodiment, the above-described metadata is transmitted to the V4 driver 203, and therefore, a value to identify the metadata is determined in advance by the application 201 and the rendering filter 211. The value of the identifier is arbitrary, and therefore, an identifier class represented by a UUID is also specified at the same time to make the identifier unique. The value of the identifier class is also determined in advance by the application 201 and the rendering filter 211. Then, as shown schematically, metadata 901 is stored in the area of the data portion. The purpose for generating a meta image in the present embodiment is to transmit metadata, which is arbitrary data, to the V4 driver 203. Because of this, in order to prevent the print results or the printing performance from being affected while maintaining the minimum appearance, 1×1 pixel is specified as the size and 24-bit color with a transmittance of 100% is specified as the color. In the case where the 24-bit color is specified as described above, "PLTE", which is the indispensable chunk, is omitted. Consequently, the meta image in the present embodiment includes the four chunks, that is, "IHDR", "IDAT", "naNo", and "IEND", as shown in FIG. 8.

At step 706, a drawing command in the GDI type that gives instructions to draw the meta image generated at step 705 is generated. At this time, the Image class and the Graphics class of the GDI+ supporting printing in the PNG format are made use of. On the other hand, at step 707, a drawing command in the GDI type in accordance with the attribute of the drawing-target object is generated. At this time, for example, the API, such as TextOut (character), Polygon (polygon), and StretchDIBits (bitmap), of the GDI is made use of.

Then, at step 708, the drawing command in the GDI type generated at step 706 or step 707 is sent to the MXDC 202. Then, at step 709, whether there is an object that is a drawing target is determined. In the case where there is an unprocessed drawing-target object, the processing returns to step 702, and the next drawing-target object is determined and the processing is continued. On the other hand, in the case where there is no unprocessed drawing-target object, this processing is terminated.

The above is the contents of the drawing command issuance processing that is performed in the application 201 according to the present embodiment. The MXDC 202 of the present embodiment faithfully converts the drawing command in the GDI type issued in the application 201 as described above into a drawing command in the XPS type. That is, in the case where the object relating to the received drawing command is a meta image, the MXDC 202 handles the drawing command as that giving instructions to draw a normal image object and converts the command into a drawing command in the XPS type without performing special processing. Then, the drawing data including the group of drawing commands whose type has been converted into the XPS type is sent to the V4 driver 203.

<PDF Conversion in V4 Driver>

Figure 10:
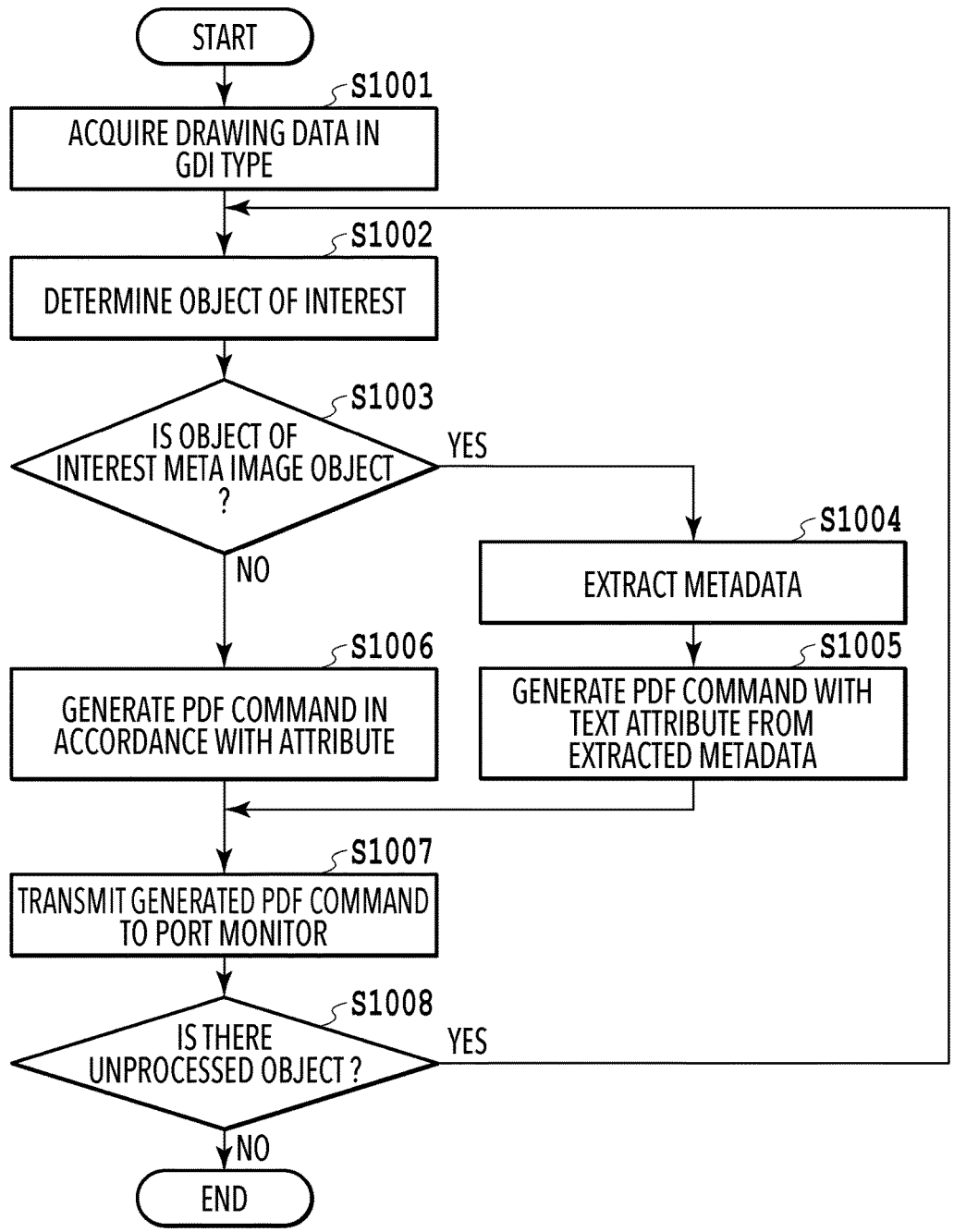
FIG. 10 is a flowchart showing a flow of processing to generate a PDF command in a V4 driver according to the second embodiment.

Following the above, processing of the rendering filter 211 to generate a PDF command in the V4 driver 203 having received drawing data in the XPS type from the MXDC 202 is explained. FIG. 10 is a flowchart showing a flow of the processing to generate a PDF command in the V4 driver 203 according to the present embodiment. This series of processing is performed in units of pages in the rendering filter 211 with the group of drawing commands in the XPS type generated in the MXDC 202 being taken as an input. In the following, detailed explanation is given along the flow in FIG. 10.

At step 1001, drawing data in the XPS type corresponding to one page, which is received from the MXDC 202, is acquired. Then, at step 1002 that follows, from the acquired drawing data corresponding to one page, an object of interest, which is a processing target, is determined.

At step 1003, whether the object of interest is a meta image object is determined by analyzing the drawing command of the object of interest. In the present embodiment, in the case where the attribute of the object of interest is the image attribute and the object of interest is in the PNG format, and the "naNo" chunk exists as an auxiliary chunk, the object of interest is determined to be a meta image object. In the case where the results of the determination indicate that the object of interest is a meta image object, the processing advances to step 1004. On the other hand, in the case where the object of interest is an object other than the meta image object, the processing advances to step 1006.

At step 1004, from a package form included in the drawing command of the meta image, metadata (in the example in FIG. 9, metadata 901) is extracted. Next, at step 1005, based on the extracted metadata, a PDF command with the text attribute is generated. Specifically, information, such as the font name, the font size, the drawing coordinate position, and the character code, included in the metadata is acquired and a PDF command with the text attribute corresponding to the acquired information is generated.

On the other hand, at step 1006 in the case where the object of interest is determined to be an object other than the meta image object, a PDF command in accordance with the attribute of the object of interest is generated.

At step 1007, the PDF command generated at step 1005 or step 1006 is sent to the port monitor 204. Then, at step 1008, whether there is an unprocessed object within the drawing data corresponding to one page, which is acquired at step 1001, is determined. In the case where there is an unprocessed object, the processing returns to step 1002, and the next object of interest is determined and the processing is continued. On the other hand, in the case where the processing of all the objects is completed, this processing is terminated. Then, in the case where the processing for all the pages of the processing-target document is completed, the PDF data including a group of the generated PDF commands is saved in the external memory 130 by the port monitor 204.

As above, according to the present embodiment, by handling a text object as a meta image object as a matter of convenience at the time of the application issuing a drawing command of the text object, it is made possible for the V4 driver to recognize the portion as a text object. As a result of this, it is made possible to generate PDL data (PDF data in the case of the PDF conversion driver) representing the object by text.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, even in the case where the attribute of an object is changed from text to non-text by the MXDC, it is possible for the V4 driver to generate PDL data (or PDF data) that gives instructions to draw the portion in drawing data in the XPS type after conversion with the text attribute.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-091575, filed May 2, 2017 which is hereby incorporated by reference wherein in its entirety.

What is claimed is:

1. An information processing apparatus comprising:
 a memory that stores at least a conversion program and a printer driver; and
 a processor that executes the conversion program and the printer driver,
 wherein the processor executes the conversion program to perform:
  receiving drawing data of a document that is output from an application in response to instructions to output the document;
  type-converting drawing commands making up the drawing data of the document into drawing commands having a predetermined type, wherein, in the type-converting, a drawing command having a text attribute that satisfies a predetermined condition is type-converted into a drawing command having a non-text attribute; and
  delivering the type-converted drawing command to the printer driver, wherein, in the delivering of the type-converted drawing command having the non-text attribute that has been converted from the drawing command having the text attribute, text information relating the drawing command having the text attribute and the type-converted drawing command having the non-text attribute are delivered to the printer driver, and
 wherein the processor executes the printer driver to perform generating an electronic document in a predetermined format based on the type-converted drawing commands received from the conversion program,
 wherein, in a case where the text information and the type-converted drawing command having the non-text attribute are received from the conversion program, the electronic document in the predetermined format is generated by converting the type-converted drawing command having the non-text attribute into an object having a text attribute based on the received text information.

2. The information processing apparatus according to claim 1,
 wherein, in the type-converting,
 the drawing command having the text attribute that satisfies the predetermined condition is type-converted into the drawing command having the non-text attribute including metadata describing the text information, and
 wherein, in the delivering of the type-converted drawing command having the non-text attribute that has been converted from the drawing command having the text attribute, the type-converted drawing command including the metadata describing the text information is delivered to the printer driver, and
 wherein, in the generating of the electronic document, in a case where the type-converted drawing command including the metadata describing the text information is received from the conversion program, the electronic document in the predetermined format is generated by obtaining an object having a text attribute based on the text information described in the metadata.

3. The information processing apparatus according to claim 2, wherein the predetermined condition is a case where a font file specified in the object with the text attribute is an embedding-prohibited font, and
 in the metadata, at least information indicating that the embedding-prohibited font is specified is included.

4. The information processing apparatus according to claim 2, wherein the predetermined condition is a case where predetermined decoration is specified for the object with the text attribute, and
 in the metadata, at least information indicating that the predetermined decoration is specified is included.

5. The information processing apparatus according to claim 4, wherein the predetermined decoration specification is specification of transmittance.

6. The information processing apparatus according to claim 1, wherein the non-text attribute is a path attribute or an image attribute.

7. The information processing apparatus according to claim 1, wherein a type of a drawing command corresponding to the printer driver is an XPS type, and
 receiving receives the drawing data in a GDI type from the application and the type-converting converts a type of the drawing commands making up the drawing data into the XPS type.

8. The information processing apparatus according to claim 1, wherein the predetermined format is a PDL or a PDF.

9. An information processing apparatus comprising:
 a memory that stores at least an application, a conversion program and a printer driver; and
 a processor that executes the application, the conversion program and the printer driver
 wherein the processor executes the application to perform:
  outputting drawing data of a document in accordance with instructions to output the document, wherein, in a case where objects within the document include an object having a text attribute that satisfies a predetermined condition, the processor executes the application to perform: converting the object having the text attribute into an object having a non-text attribute; and outputting the drawing data of the converted object having the non-text attribute and text information corresponding to the object having the text attribute, and wherein the processor executes the conversion program to perform:

receiving the drawing data from the application;

type-converting drawing commands making up the drawing data into drawing commands having a predetermined type; and delivering the type-converted drawing commands to the printer driver, and wherein the processor executes the printer driver to perform:

generating an electronic document in a predetermined format based on the type-converted drawing commands received from the conversion program, wherein, in a case where the type-converted drawing commands having the non-text attribute and the text information are received from the conversion program, the electronic document in the predetermined format is generated by obtaining an object having a text attribute based on the text information.

10. The information processing apparatus according to claim 9, wherein in the type-converting, in a case where the objects within the document include the object having a text attribute that satisfies the predetermined condition, the object having the text attribute is converted into the object having the non-text attribute including metadata describing the text information relating to the object, and, in the outputting, the drawing data of the converted object having the non-text attribute including the metadata describing the text information are output, and wherein the electronic document in the predetermined format is generated by obtaining the object having the text attribute based on the text information described in the metadata.

11. The image processing apparatus according to claim 10, wherein the predetermined condition is a case where a font file specified in the object with the text attribute is an embedding-prohibited font, and in the metadata, at least information indicating that the embedding-prohibited font is specified is included.

12. The information processing apparatus according to claim 11, wherein the predetermined condition is a case where predetermined decoration is specified for the object with the text attribute, and in the metadata, at least information indicating that the predetermined decoration is specified is included.

13. The information processing apparatus according to claim 12, wherein the predetermined decoration specification is specification of transmittance.

14. The information processing apparatus according to claim 9, wherein the non-text attribute is a path attribute or an image attribute.

15. The information processing apparatus according to claim 9, wherein a type of a drawing command corresponding to the printer driver is an XPS type, and the receiving receives drawing data in a GDI type from the application and the type-converting converts a type of the drawing commands making up the drawing data into the XPS type.

16. The information processing apparatus according to claim 9, wherein the predetermined format is a PDL or a PDF.

17. A non-transitory computer readable storage medium storing a driver that causes a computer to perform:

receiving drawing commands converted by a conversion module, wherein the conversion module causes the computer to:

receive drawing data of a document that is output from an application;

type-convert drawing commands making up the drawing data into drawing commands having a predetermined type, wherein a drawing command having a text attribute that satisfies a predetermined condition is type-converted into a drawing command having a non-text attribute; and deliver the type-converted drawing commands to the driver, wherein, in the delivering of the type-converted drawing command having the non-text attribute that has been converted from the drawing command having the text attribute, text information relating the drawing command having the text attribute and the type-converted drawing command having the non-text attribute are delivered to the driver; and, generating an electronic document in a predetermined format based on the received type-converted drawing commands, wherein, in a case where the text information and the type-converted drawing command having the non-text attribute are received from the conversion module, the electronic document in the predetermined format is generated by obtaining an object having a text attribute based on the received text information.

18. The non-transitory computer readable storage medium according to claim 17, wherein the conversion module further causes the computer to:

type-convert the drawing command having the text attribute that satisfies the predetermined condition into the drawing command having the non-text attribute including metadata describing the text information; and deliver the type-converted drawing command including the metadata describing the text information to the driver, and wherein the driver causes the computer to perform generating the electronic document in the predetermined format by obtaining an object having a text attribute based on the text information described in the metadata.

19. The non-transitory computer readable storage medium according to claim 17, wherein the non-text attribute is a path attribute or an image attribute.

20. A non-transitory computer readable storage medium storing a conversion module that causes a computer to perform:

receiving drawing data of a document that is output from an application in response to instructions to output the document;

type-converting drawing commands making up the received drawing data of the document into drawing commands having a predetermined type, wherein, in the type-converting, a drawing command having a text attribute that satisfies a predetermined condition is type-converted into a drawing command having a non-text attribute; and delivering the type-converted drawing commands to a driver program, wherein, in the delivering of the type-converted drawing command having the non-text attribute that has been converted from the drawing command having the text attribute, text information relating the drawing command having the text attribute and the type-converted drawing command having the non-text attribute are delivered to the driver program, wherein the driver program causes the computer to perform generating an electronic document in a predetermined format based on the type-converted drawing commands received from the conversion module, wherein, in a case where the text information and the type-converted drawing command having the non-text attribute are received from the conversion module, the electronic document in the predetermined format is generated by obtaining an object having a text attribute based on the received text information.

\* \* \* \* \*